July 4, 1972   J. H. LANCOR, JR   3,674,346
AUDIO-VISUAL RECORDING AND DISPLAY METHODS AND APPARATUS
Original Filed Nov. 20, 1967   4 Sheets-Sheet 1

Fig.6

United States Patent Office 3,674,346
Patented July 4, 1972

3,674,346
AUDIO-VISUAL RECORDING AND DISPLAY METHODS AND APPARATUS
Joseph H. Lancor, Jr., Arcadia, Calif., assignor to Bell & Howell Company, Chicago, Ill.
Original application Nov. 20, 1967, Ser. No. 684,254, now Patent No. 3,539,248, dated Nov. 10, 1970. Divided and this application Jan. 2, 1970, Ser. No. 5,396
Int. Cl. G03b 31/04
U.S. Cl. 352—12                              8 Claims

ABSTRACT OF THE DISCLOSURE

Audio-visual display methods and apparatus in which sound accompaniments are automatically started in response to indications on the image film, and in which sound sequences are automatically stopped in response to indications on the sound recording medium; and methods and apparatus for providing audio-visual display media in which start indications for sound sequences are provided on image film, while stop indications for sound sequences are provided on the sound recording medium.

---

This is a division of application Ser. No. 684,254, filed Nov. 20, 1967, now U.S. Pat. No. 3,539,248, issued Nov. 10, 1970, to Joseph H. Lancor, Jr.

BACKGROUND OF THE INVENTION

(1) Field of the invention

The subject invention relates to the still and motion picture art, and more particularly to that aspect of this art which is concerned with the provision of sound accompaniments for pictorial presentations.

(2) Description of the prior art

The desire to provide motion pictures with sound accompaniment is as old as the motion picture art itself. Since motion picture viewers are accoustomed from their daily experience to perceive their environment both visually and aurally, it was soon recognized that the impression of live performances could only be attained upon a synchronous recording and reproduction of the sound accompaniment with the action on the film.

From the point of view of the professional motion picture producer, the most satisfactory method for attaining the latter goal resides in the employment of a sound film technique in which an optical sound track is provided on the motion picture film itself. This avenue is, however, generally closed to the average amature in view of the intricacies of optical sound recording and the delicacy and high cost of the required equipment.

With the advent of magnetic tape recording, it was believed that the problem under consideration could readily be solved by providing a magnetic sound recording track along a margin of the motion picture film and by using magnetic sound recording and reproduction heads for providing synchronous sound accompaniments. However, such a system still leaves many problems unsolved and even introduces difficulties of its own.

For instance, the presence of a magnetic recording track on the film itself still requires, as with optical sound recording, that the film be moved at continuous velocity past the recording and playback devices. In contrast thereto, practically all movie cameras and projectors on the market are of the intermittent film advance type. Moreover, the provision of a magnetic sound track on the film requires special operations and results in increased expenses.

Furthermore, the fairly stiff and relatively heavy film materials that have to be used for motion picture purposes generally make a poor carrier for a magnetic sound recording track, which should be located on a light and highly flexible tape to assure a smooth passage of the recording medium past the recording and playback heads.

A further problem arises from the tendency in the amateur motion picture field to maintain the film speed at a relatively low level to economize the consumption of film. Where a sound track is provided on the motion picture film, reductions in film speed necessarily lead to a reduction in the quality of the recorded and reproduced sound accompaniment.

All these problems have been known for a long time, but a decisive solution adapted to the needs of the growing number of motion picture amateurs is still wanting. This is particularly apparent if the circumstances of those amateurs are considered that take motion pictures with relatively inexpensive equipment to provide a record of family events, vacation trips, and other occurrences of private interest.

Typically, amateurs of this type are in the habit of taking motion pictures in the form of short sequences, the duration of each of which can be measured in seconds and seldom extends into the range of minutes. In the normal course of events, sequences during which a recording of sound is of interest are interspersed with passages that are intended to be displayed in a silent fashion. Also, each sound accompaniment sequence usually is peculiar to a particular motion picture sequence.

It will be noted that similar circumstances exist in certain fields of professional motion picture taking, such as in the area of television or news reel reporting, or in the growing area of motion picture production with post-synchronous sound recording.

A proper perspective of the problem presently under consideration can be gained from a brief review of past proposals in the area of audio-visual recording and playback with separate image and sound recording media.

According to an early effort, described in U.S. Pat. 1,049,171, issued Dec. 31, 1912, to F. W. Thormeyer, a talking machine driving a record of sound accompaniment was started at the scene-correct time by the closure of an electric contact which was actuated either by an image counting mechanism or by a slot in the motion picture film. The disadvantage of that proposal was that manual actuation of a switch was required for a stopping of the sound playback.

A similar shortcoming was inherent in a proposal described in U.S. Pat. 1,184,935, issued May 30, 1916, to C. W. Ebeling, and teaching the use of magnetic members fastened on the film in lieu of the above mentioned slots.

When the advantages of an automatic control of both the start and the stopping of sound accompaniment playbacks became apparent, the solution moved in the direction of allocating both control functions to the motion picture film. According to U.S. Pat. 1,523,173, issued Jan. 13, 1925, to W. M. Clark, first slots were provided on the film for starting a sound playback operation, and second slots were cut into the same film for terminating the playback of the particular sound sequence. This proposal had the disadvantage of requiring sensing equipment which was capable of distinguishing between the two types of slots. To satisfy this requirement, the above mentioned first and second slots were positioned near opposite margins of the film. This, however, resulted in an untenable consumption of film space.

Moreover, the cutting of slots into the film weakened its structure and exposed it to increased wear and tear. This later problem is alleviated by proposals of the type disclosed in the following patents:

French Pat. 696,527, issued Oct. 14, 1930, to Hans

Friess, and showing the provision of electrically conducting contact markings on motion picture film for actuating sound playback equipment;

British patent specification 504,808, Leon Garganof et al., dated July 23, 1937, and disclosing the provision of photo-electrically discernible screen or mask spots on cinematograph film in lieu of control notches;

U.S. Pat. 2,354,583, issued July 25, 1944, to W. C. Eddy, and disclosing the generation of synchronizing pulses from a sound record and the photographing of these pulses on motion picture film;

U.S. Pat. 3,047,675, issued July 31, 1962, to J. I. Berryhill, and disclosing the provision of clusters of opaque or reflecting markings on motion picture film to vary the volume of a sound accompaniment; and U.S. Pat. 3,278,251, issued Oct. 11, 1966, to Otto Freudenschuss and showing the use of a miniature incandescent lamp for exposing a margin of film in a motion picture camera during the filming of the picture. The miniature lamp is energized through a parallel-connected capacitor and resistor for providing a strong illumination upon actuation of the camera release, and a weaker illumination thereafter.

While these proposals avoid a cutting of slots into the film, a system solving the above mentioned problems is not apparent from any of the foregoing patents.

Thus, the above mentioned Friess patent teaches the provision of several distinct sound machines for the playback of different sound accompaniments, while the Garganof et al. patent specification mentions the provision of a sound track on the film. The Eddy patent, on the other hand, uses the recorded pulse marks on the film to regulate the speed of the projector motor, rather than to control the commencement and termination of sound recording and reproduction operations, while the Freudenschuss patent is silent on the purpose of the exposures provided by the above mentioned miniature lamp.

The Berryhill patent, finally, uses the above mentioned marking clusters to control the volume of sound typically derived from a sound track on the film.

In the post-synchronous recording area, apparatus are known in which sound recording apparatus are started and stopped synchronously with motion picture film, as is apparent from the German Pat. 826,409, issued Nov. 22, 1951 to Werner Zorn, U.S. Pat. 3,049,965, issued Aug. 21, 1962, to Dennis Gunst, and the article "A New System for Post-Synchronous Recording," also by Dennis Gunst, 69 SMPTE, October 1960, pp. 720–22. However, according to the Zorn patent the markings for both the starting and the stopping of the sound machine are provided on a leader of the motion picture film, while the Gunst system starts the sound recorder in response to the actor's voice. Accordingly, the aspect of the Zorn system which is here of interest is comparable to the above mentioned aspect of the Clark patent, while the Gunst system would not be suitable in situations in which control of the sound accompaniment start by an actor's voice is not feasible or convenient.

A system in which a playback of sound sequences is started in response to control notches on a film and is stopped in response to control signals on a sound tape is shown in the Waller et al. Pats. 2,475,439 and 2,606,476, issued, respectively, on July 5, 1949, and Aug. 12, 1952. However, the underlying concept of that system proceeds from a choice of the sound tape as the primary agent for controlling the advance of the film. In consequence, the first sound sequence in a given series of sound accompaniments cannot be started in response to control notches on the film.

In terms of operation, this necessitates a manual transition of the system between the first and second sound sequences from a mode of operation in which the film advance is controlled from the tape to a mode of operation in which the film advance mechanism is energized by a pulse source or stepping switch.

A large number of further proposals for audio-visual synchronization proceeds on the basis of a continuous or continual enslavement of the advancement of the picture film to the advancement of a separate sound record by means of pulses produced by operation of the sound machine or sound tape, or by means of control operations involving a comparison of pulses of the latter type with pulses produced by the operation of the picture projector. These proposals are exemplified in U.S. Pats. 1,736,323, Murdock (1929); 2,503,083, Waller (1950); 2,575,203, Wolfner (1951); 2,584,645, Wagner (1952); 2,637,785, Charlin (1953); 2,679,187, Bitting (1954); 2,693,127, Ortman (1954); 2,797,611, Anthony (1957); 2,822,722, Kennedy (1958); 2,878,321, Davis (1959); 2,932,235, Ochiai (1960); 2,961,919 De Angelo (1960); 2,975,672, Shields (1961); 2,985,060, Reinsch et al. (1961); 2,993,406, Straub (1961); 3,006,240, Höller (1961); 3,025,751, Braun (1962); 3,232,167, Schwartz et al. (1966); 3,266,862, Wagoner (1966); British patent specification 341,152, McCormack (1931); British patent specification 342,345, Electrical Research Products, Inc., et al. (1931); British patent specification 343,811, N.V. Philips' Gloeilampenfabricken (1931); British patent specification 354,170, F. A. Mitchell (1931); British patent specification 770,372, Charles Oliveres (1957); British patent specification 856,778, Telefunken G.m.b.H. (1960); French Pat. 1,101,732, Jean Rebillard (1955); and French Pat. 1,106,773, Charles Oliveres (1955), the French counterpart of the above mentioned British Oliveres patent specification.

Examples of mechanical or combined mechanical and electrical film advance-sound playback synchronizing systems are apparent from U.S. Pat. 2,551,349, Supitilov (1951), which proposes the use of a flexible shaft between a sound playback drive and the picture film; U.S. Pat. 2,782,677, Steigman (1937), U.S. Pat. 2,880,645, Steigman (1959), and U.S. Pat. 2,882,788, Steigman (1959), which propose a gearing of a sound tape to a motion picture film and the sensing of a slack of the sound tape; U.S. Pat. 2,911,822, Hicks (1959), which proposes the use of perforated sound tapes; U.S. Pat. 2,996,948, Beachell (1961), which also proposes the use of perforated sound tape; U.S. Pat. 3,160,888, Midlash (1964), which teaches the use of a flexible drive shaft between a motion picture projector and a magnetic tape recorder; U.S. Pat. 3,223,469, Cech et al. (1965), which runs the sound tape through the projector; and U.S. Pat. 3,233,957, Loveland (1966), which runs the motion picture film through an attachment of the sound playback apparatus.

To complete the picture, reference may also be had to the French Pat. 1,034,872, by Louis-Yvon Pector (1953), which shows a temporary stopping of a sound playback after each sound sequence.

Despite this impressive wealth of proposals which manifest consistent efforts on an international scale for a plurality of decades, the motion picture art is still devoid of a system which would solve the above mentioned problems.

SUMMARY OF THE INVENTION

Broadly speaking, the subject invention provides methods and apparatus which enable an automated recording of individually allocated sound sequences during the filming of image sequences, some of which may be filmed for a silent display, and which enable an automated playback of individually allocated sound sequences during the display of image sequences, some of which may be displayed in a silent fashion.

While the prior art has been described above primarily in terms of motion picture filming and display, it will be recognized as this description proceeds that aspects of the subject invention are also applicable to related arts, such as the sequential display of still pictures with selectively allocated sound accompaniment.

Moreover, while the subject invention is ideally suited to meet the above mentioned special problems encountered in the amateur motion picture field, those skilled in the art will recognize the applicability of methods and apparatus disclosed herein to professional fields, such as news reporting or motion picture production with post-synchronous sound recording.

From one aspect thereof, the subject invention resides in a method of reproducing sound sequences from a moving sound recording medium being started at the beginning of each sound sequence and stopped at the end of each sound sequence to provide individually allocated sound accompaniments for a plurality of pictorial presentations displayed by image display means.

According to this aspect of the invention, the method just mentioned comprises the steps of automatically starting the mentioned recording medium at the beginning of each sound sequence in response to a predetermined operation of the image display means, and automatically stopping the recording medium at the end of each sound sequence in response to intelligence derived from the sound recording medium.

In the method presently under consideration the automatic starting of the recording medium at the beginning of each sound sequence is an important step since it eliminates cumbersome manual adjustment operation for a synchronous commencement of the first sound sequence.

According to a related aspect of the subject invention, the invention resides in a method of reproducing sound sequences from a moving sound recording medium which is started at the beginning of each sound sequence and stopped at the end of each sound sequence to provide individually allocated sound accompaniments for a plurality of pictorial presentations displayed from film.

This method comprises the steps of providing for the start of each sound sequence a start indication on the film, and for the termination of each sound sequence a stop indication on the sound recording medium, as well as the steps of automatically starting the recording medium at the beginning of each sound sequence in response to a start indication on the film, and automatically stopping the recording medium at the end of each sound sequence in response to a stop indication on the sound recording medium.

The stop indications may be recorded oscillation bursts, for instance, or may be manifested by the end of a continuous control signal, such as the end of a train of synchronization pulses, to name another example.

From another aspect thereof, the invention resides also in a method of recording sequences of sound accompaniment for motion picture sequences recorded on film, and of playing back these sound accompaniment sequences during the reproduction of the motion picture sequences from the film.

This method comprises the steps of recording the sound accompaniment sequences on a moving sound recording medium being started at the beginning of each sound sequence, and being stopped at the end of each sound sequence, providing on the film for each of the sound sequences an indication denoting the start of a sound sequence, providing on the recording medium for each of the sound sequences a stop indication denoting the termination of a sound sequence, starting the playback of each sound sequence during the reproduction of motion picture sequences in response to a start indication on the film, and terminating the playback of each sound sequence in response to a stop indication on the sound recording medium.

The invention resides also in apparatus including selectively actuable motion picture camera means for photographing visual impressions on film, and selectively actuable sound recording means for recording, on a recording medium separate from the film, sound impressions accompanying at least selected ones of the visual impressions.

This apparatus includes the improvement which comprises, in combination, means responsive to an actuation of the camera means for actuating the recording means to record sound impressions on the recording medium, and for providing an indication on the film denoting the start of a sound recording operation, and means responsive to a stopping of the camera means for stopping the recording means and for providing on the sound recording medium an indication denoting the stopping of a sound recording operation.

An important aspect of the invention resides also in a delayed starting of the recording or playback of each sound sequence with respect to the start of the motion picture sequence to which the particular sound sequence is allocated, and a correspondingly delayed provision of each sound starter mark on the film.

As will become apparent as the present description proceeds, this provides for an important safety margin against a premature arrival of a sound starter mark, and also against an inadvertent removal of starter marks through accidental destruction of an initial length of the film during processing.

Other aspects of the invention will become apparent as the subject description proceeds.

BRIEF DESCRIPTION OF THE DRAWINGS

The invention and its various aspects and objectives will become more readily apparent from the following detailed description of preferred embodiments thereof, illustrated by way of example in the accompanying drawings in which.

DESCRIPTION OF PREFERRED EMBODIMENTS

Figures 1, 3, 4:
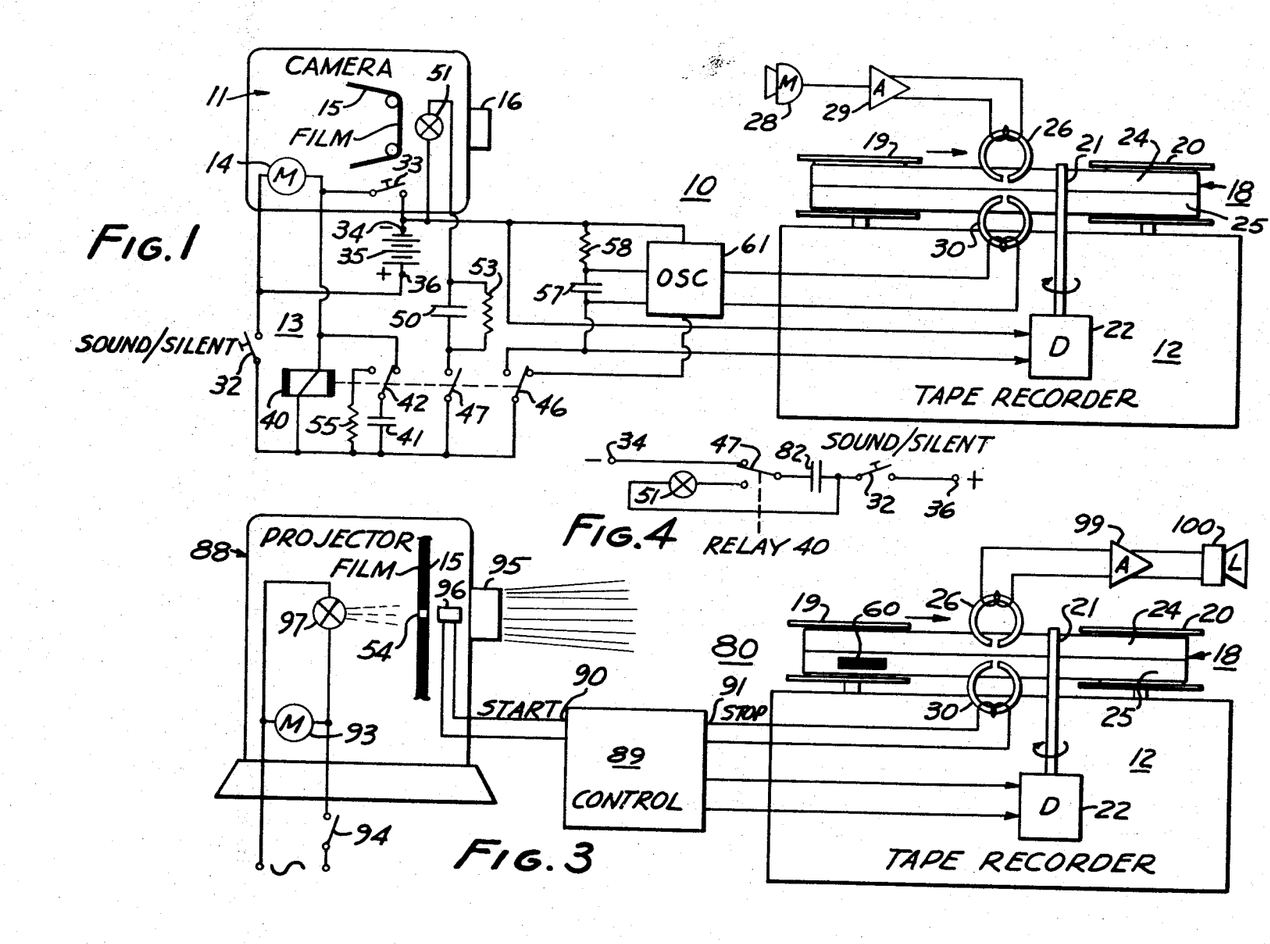
FIG. 1 is a schematic illustration of an audio-visual recording system in accordance with a preferred embodiment of the invention.
FIG. 3 is a schematic illustration of an audio-visual display system in accordance with a preferred embodiment of the invention.
FIG. 4 is a diagram of a modification of the system shown in FIG. 1.

The audio-visual recording system 10 schematically illustrated in FIG. 1 includes a motion picture camera 11 and a magnetic tape recorded 12, as well as a control 13. The camera 11 includes an electric motor 14 for driving a mechanism (not shown) which intermittently advances a motion picture film 15 and which operates a shutter (not shown) for sequentially exposing the film for the photographing of scenery through a lens system 16. The camera parts so far described, as well as other parts which are conventionally provided in motion picture cameras, may all be of a customary construction. It will also be understood that the camera 11 may be of a continuous film motion type, rather than of the more conventional intermittent film advance kind.

The tape recorder 12 may also be of a conventional type in which a magnetic recording tape 18 is driven from a supply reel 19 to a take-up reel 20 by means including a capstan 21 which is rotated by an electric drive or motor 22.

The tape 18 may be broadly considered as a sound recording medium. In the embodiments illustrated herein, tape 18 has a sound track 24 and a control track 25. A first magnetic recording head 26 is adapted to record sound accompaniments on the sound track 24 of the tape 18. These sound accompaniments may be picked up by a microphone 28 which is connected to a recording amplifier 29 that drives the first recording head 26.

A second recording head 30 is adapted to record control signals in the control track 25 of the tape 18, in a manner to be more fully described below.

Figure 2:
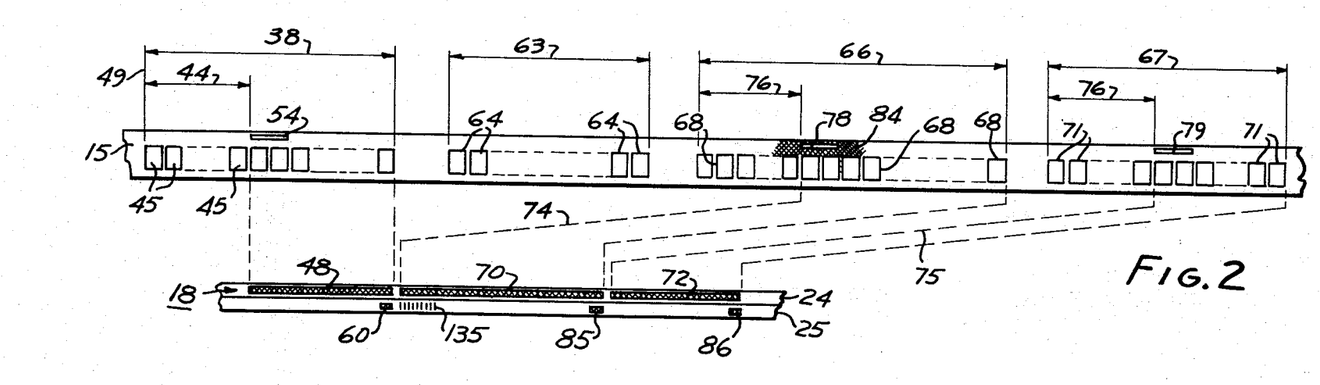
FIG. 2 is an illustration of audio-visual recording and playback media in accordance with a preferred embodiment of the subject invention.

As an aid to an understanding of the operation of the audio-visual recording system shown in FIG. 1, a length of the film 15 and a related length of the tape 18 are shown in FIG. 2, and will be continually referred to as this description proceeds.

To prepare the equipment of FIG. 1 for sound recording, a switch 32, illustrated in a normally open position, is closed. The filming of a motion picture sequence with simultaneous sound recording may then be started by closing a switch 33 which may be considered a camera release.

Closure of the switch 33 completes a circuit from the negative terminal 34 of a battery 35 through the camera drive motor 14 to the positive terminal 36 of the battery 35. In this manner, the filming of a first motion picture sequence, schematically shown at 38 in FIG. 2, is started and will continue until the switch 33 is reopened.

Closure of the switch 33 causes the battery 35 not only to energize the motor 14, but also a relay 40 which is connected to the positive battery terminal 36 through the previously mentioned switch 32.

As illustrated in FIG. 1, a capacitor 41 is connected in parallel to the winding of the relay 40 through a normally closed contact 42 of this relay. The purpose of the capacitor 41 is to impose a time delay on the action of the relay 40 so that this relay will actuate its contacts, including the contact 42, only after the lapse of a predetermined period of time from the closing of the switch 33.

This delay is indicated in FIG. 2 at 44. During this period 44, the camera 16 will photograph a number of image frames 45 on the film 15.

In addition to the contact 42 already mentioned, the relay 40 includes further contacts 46 and 47 which are closed in the time-delayed manner just mentioned. Closing of the contact 46 completes an energization circuit for the tape recorder drive 22 from the battery 35 and through the switch 32 and contact 46. The tape 18 is thus started for a recording of sound in the track 24 of the tape. This sound may comprise aural impressions that emanate from the scene being filmed. Alternatively or additionally, explanatory comments or musical accompaniments may be recorded in the sound track 24.

As illustrated in FIG. 2, the time delay 44 provided by the relay 40 and capacitor 41 has the effect of postponing the start of the recording of the sound accompaniment 48 relative to the start 49 of the particular motion picture sequence.

When the relay 40 actuates its contacts 42 and 46, it also closes a contact 47 which completes a circuit that extends from the positive battery terminal 36 through the switch 32, the closed contact 47, a capacitor 50, a miniature incandescent lamp 51, to the negative battery terminal 34. Current from the battery 35 will thus charge the capacitor 50 through the lamp 51 which will briefly light up and expose a marginal portion of the film 15. Once the capacitor 50 has been charged in this manner, it will preclude further energization of the lamp 51, until the capacitor 50 has been discharged and is being charged anew through closure of the relay contact 47

In practice, it will be found that the internal conductance of the capacitor 50 is frequently sufficient to assure a discharge of the capacitor 15 during the periods of time in which the relay contact 47 is open. If necessary, a discharge resistor 53 may be connected across the capacitor 50. It is, however, important that this discharge resistor 53 be large enough so that the lamp 51 is not able, after the capacitor 50 has been charged in the above mentioned manner, to light up in a manner sufficient to expose the film significantly.

In other words, the lamp 51 will only emit a short burst of light the duration of which is limited to the filming of one, two or three image frames. The film exposure provided by such a light burst is illustrated in FIG. 2 at 54. This exposure 54 indicates on the film 15 the start of the sound sequence 48 on the sound recording tape 18.

Figure 5:
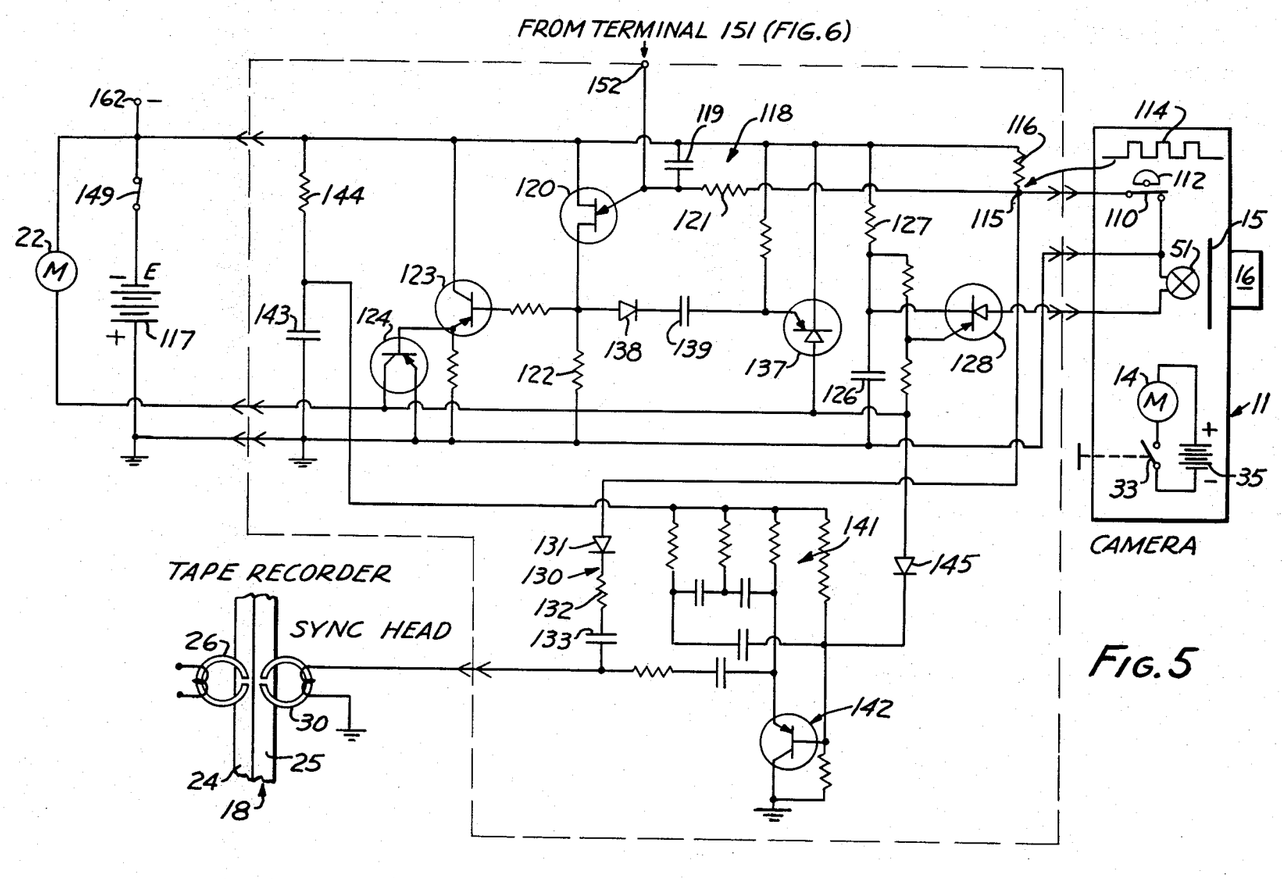
FIG. 5 is a circuit diagram of an electronic control which may be incorporated in the system shown in FIG. 1.
Figure 7:
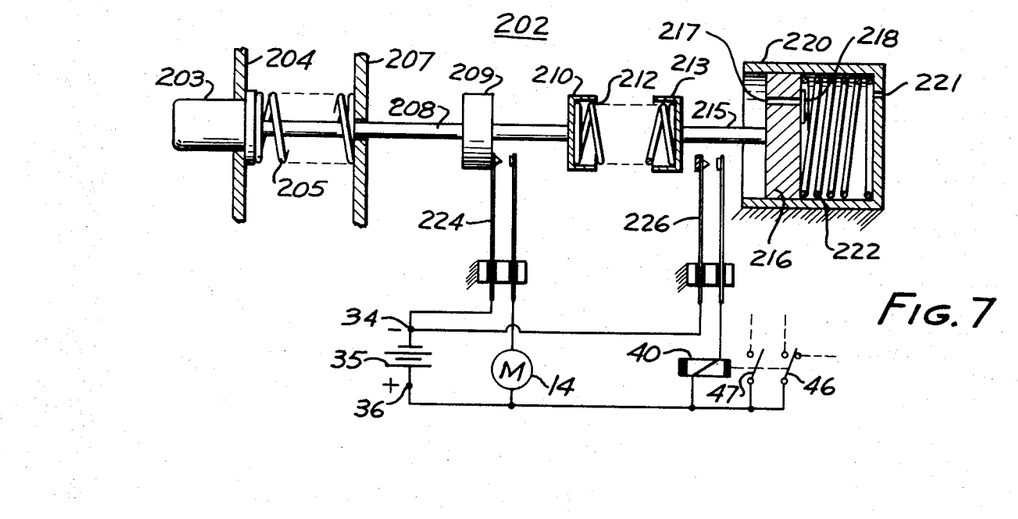
FIG. 7 is a sectional view of a control mechanism which may be incorporated in the system shown in FIG. 1.

If the operator wishes to terminate the filming of a motion picture sequence, he opens or releases the switch 33. This deenergizes the motor 14, so that the film 15 in the camera stops. At the same time the relay 40 is deenergized so that its contacts 42, 46 and 47 return to their rest position. No time delay occurs in this operation, since the capacitor 41 is discharged through a resistor 55 while the relay 40 is in the actuated state. In this connection it should be noted that the capacitor 41 with relay contact 42 and dischargre resistor 55 is only one illustrative example of means for imposing a delayed activation on the relay 40. Delayed switching may also be provided by electronic circuit means, as illustrated in FIG. 5, or by a mechanism, as illustrated in FIG. 7, to name two examples.

Opening of the relay contact 46 interrupts the energization of the tape drive 22, so that a stopping of the tape 18 is initiated. At the same time the second recording head 30 is caused to record a signal in the control track 25 of the tape 18. This signal is shown at 60 in FIG. 2 and indicates the end of the particular sound sequence 48.

The termination signal 60 is produced as follows. While the relay contact 46 is closed, a capacitor 57 can charge itself from the battery 35 through a resistor 58. The capacitor 57 retains its charge after the relay contact 46 is opened and is thus able to energize an oscillator 61 which receives a gating signal through the relay contact 46 when the relay 40 has been deenergized. The oscillator 61 will thereupon emit a short burst of alternating current which, when recorded in the control track 25 by the head 30, constitutes the previously mentioned sound termination signal 60.

If no sound accompaniment is to be recorded during the filming of a motion picture sequence, the sound silent switch 32 is maintained open. In this manner, only the camera drive motor 14 is energized when the camera release switch 33 is closed. Neither the tape recorder 12 nor the lamp 51 are then actuated. Accordingly, no sound tape is spent while the camera is running during the filming of a silent motion picture sequence. A silent sequence of the type just mentioned is illustrated at 63 in FIG. 2, and is therein composed of image frames 64.

As an alternative, the sound silent switch 32 may be closed, even if no sound is to be recorded during the filming of the particular motion picture sequence. In this case, the sound recording head 26 is rendered ineffective, such as by disconnecting this head from the amplifier 29. The tape drive 22 is then started and the lamp 51 energized by the control 13 as if sound were being recorded during the filming of the picture sequence. Also, the control 13 causes the head 30 to place a sound sequence termination mark on the tape 18 at the end of the filming of the particular motion picture sequence. By following this procedure, a blank space is provided on the sound portion 24 of the tape. This blank space may subsequently be used to provide a sound accompaniment for the particular motion picture sequence. In this manner, the technique of post-synchronous sound recording is readily applicable to the audio-visual recording system of the subject invention.

If the next motion picture sequence is again to be accompanied by sound, the switch 32 is closed prior to actuation of the camera release 33. As before, the time delayed action of the relay 40 will cause the tape recorder 12 to start only after a predetermined delay from the time the camera release 33 is actuated. Moreover, the same delay will occur between each further start of a sound-accompanied motion picture sequence and the provision of the above mentioned sound start indication on the film 15 by the lamp 51.

To illustrate these facts, two further motion picture sequences 66 and 67 are shown in FIG. 2. The motion picture sequence 66 is composed of a plurality of image frames 68 and has allocated thereto the sound accompaniment recording 70 with a termination mark 85. Similarly, the motion picture sequence 67 is composed of image frames 71 and has allocated thereto the sound accompaniment recording 72 with a termination mark 86.

As indicated by dotted lines 74 and 75, each of the sound accompaniment sequences 70 and 72 commences only after a delay 76 from the start of the particular motion picture sequence. As further indicated in FIG. 2, each of the sound sequence start indications 78 and 79 provided on the film 15 by the lamp 51 is also displaced from the start of the particular motion picture sequence by the delay 76. In other words, the first few frames of each motion picture sequence that is to be accompanied by recorded sound will be played back in a silent fashion.

The provision of the delays 44 and 76 illustrated in FIG. 2 by the above mentioned action of the audiovisual recording system shown in FIG. 1 is a very important feature of the preferred embodiments illustrated herein, as will become apparent from a consideration of the operation of the audio-visual recording system 80 shown in FIG. 3 and to be described below.

At the present time, it should be noted that the lamp 51 in the camera 11 need not necessarily be energized by a capacitor charging current. The desired short light bursts can, for example, also be provided by the discharge of a capacitor. This possibility is illustrated in FIG. 4 which shows a circuit that may be incorporated into the system of FIG. 1.

According to FIG. 4, the contact 47 of the relay 40 is constructed so that a capacitor 82 will be charged from the battery terminals 34 and 36 while the sound silent switch 32 is closed and the relay 40 is deenergized. The capacitor 82 will subsequently discharrge itself through the lamp 51 in the camera 11, thereby causing the film 15 to be exposed as mentioned above by a short burst of light. As apparent from FIG. 4, this takes place when the relay 40 closes its relay contact 47 after the above mentioned delay from the actuation of the camera release 33. It will now be recognized that FIG. 4 illustrates a way in which the lamp 51 in the camera 11 can be energized by a capacitor discharge current, as contrasted from a capacitor charging current.

One advantage of the system shown in FIG. 1 resides in the fact that the sound starter marks 54, 78 and 79, which are provided in a latent form on the film 15 by the miniature lamp 51, may be readily developed during the photochemical processing of the film. To this effect the film margin where the marks 54, 78 and 79 are located is exposed during the development of the film. When the film is developed in a negative-to-positive process, this may be accomplished by avoiding a masking of the film margin, while the positive film is printed by means of light from the negative film, whereupon this margin will in the fully developed film be of a dark color, such as black, except for the location of the marks 54, 78 and 79, where the film will be transparent. This is illustrated in FIG. 2 by means of a crosshatched area 84.

The same effect may be produced if the film 15 is developed by a reversal process which includes an exposure to light of the film at a predetermined instance during chemical processing.. In this case, a light exposure of the film margin during the reversal process will darken or blacken the margin except for the sound start indications 54, 78 and 79.

It will be noted in this connection that FIG. 2 does not show any of the usual sprocket holes found on motion picture film. If in a given situation such sprocket holes are located in the area where the starter marks are recorded, there may be interference from the sprocket holes with the operation of the equipment which senses the starter marks.

The audio-visual display system 80 shown in FIG. 3 includes the above mentioned tape recorder 12 and a projector 88, as well as a control 89. This control is of a type which will energize the tape recorder drive 22 in response to a signal appearing at a start signal input 90, and will stop the tape drive 22 in response to a stop signal appearing at a stop signal input 91. A practical example of such a control is illustrated in detail in FIG. 6 to be described below.

The projector 88 includes an electric motor 93 which may be energized through a switch 94 and which has the purpose of driving mechanism (not shown) for advancing the film 15 and for actuating a shutter (not shown) which may be of a conventional type.

The projector 88 also includes a lens system 95 for projecting images contained on the film 15 on a projection screen. In this connection, it will of course be understood that the film 15 is photographically developed before it is inserted into the projection 88. As indicated above in connection with FIG. 2 the film exposed in the camera 11 may be processed by means of a reversal process in which the same film that was in the camera will also be in the projector, or by means of a positive-to-negative procedure in which the film in the projector 88 will be a positive print of the film exposed in the camera 11.

The projector 88 further includes a photocell 96 which senses the above mentioned starter marks on the film 15 which, for this purpose, are illuminated by a source of light 97. To illustrate this principle, the above mentioned starter mark 54 is shown on the film 15 in FIG. 3.

When the starter mark 54 appears in front of the photocell 96, an electric current is produced and is applied to the start signal input 90 of the control 89. This electric current, which is of limited duration in view of the limited length of the mark 54, serves as a start signal for the control 89 so that the latter will turn on the tape recorder drive 22. In this manner, the sound accompaniment sequence 48 shown in FIG. 2 will be played back through the head 26, which now serves as a pickup head, the playback amplifier 99 and loudspeaker 100, while the corresponding motion picture sequence will be displayed by the projector 88 at the same time.

The end of the sound sequence 48 will be signaled by the above mentioned stop mark 60 in the control track portion 25 of the tape 18. This stop mark is picked up by the magnetic head 30 which converts this mark into a stop signal that is applied to the input 91 of the control 89. As indicated above, the control 89 stops the tape recorder drive 22 in response to the latter stop signal.

The tape recorder 12 in FIG. 3 will remain stopped until another starter mark, such as the mark 78 shown in FIG. 2, appears on the film in front of the photocell 96. In this manner, a stopping of the tape recorder during a display of a silent motion picture sequence, such as the sequence 63 shown in FIG. 2, is effected automatically in a convenient fashion which does not require special manipulations by the operator of the equipment.

A restarting of the tape recorder for a playback of subsequent sound accompaniment sequences is also effected in the same automatic manner by means of the further starter marks, such as the marks 78 and 79, shown in FIG. 2.

The importance of the delays 44 and 76 indicated in FIG. 2 between the start of a motion picture sequence and the start of the corresponding sound accompaniment will now be explained.

In the course of the display of a motion picture sequence it is sometimes possible that the start indication for a new sound sequence appears in front of the photocell 96 before the stop indication of the next preceding sound sequence has arrived at the control pickup head 30. This may, for instance, occur if the film 15 has shrunk relative to its original dimensions or if the advance of the film during a display sequence should proceed at a somewhat faster rate than the corresponding advance of the sound tape.

For illustrative purposes, it is assumed that the sound start indication 79 shown in FIG. 2 arrives in front of the photocell 96 in the projector 88 prior to the arrival of the sound sequence termination mark 85 (see FIG. 2) at the control head 30. In this case, the control 89 will not be able to start a playback of the sound sequence 72, since the tape recorder drive 22 will be stopped upon the arrival of the termination mark 85 at the control head 30. This means that the motion picture sequence 67 will be played back in a silent fashion; that is, without its sound accompaniment 72.

In practice, great inconveniences result from such an omission, since cumbersome manipulations will then be necessary to correlate the sound accompaniments again to the particular motion picture sequences.

To overcome these difficulties, the above mentioned delays 44 and 76 (see FIG. 2) are introduced. In practice these delays need not be of a long duration if the individual motion picture sequences are relatively short, or if means are employed, such as those shown in FIG. 6, to maintain synchronism between the film and the sound tape during the display operation. A delay of the order of one to three seconds, which corresponds to some ten to sixty image frames, has been found to be a practical value.

It has also been found that these delays, which manifest themselves in a silent display of the first few frames of each sound sequence, are well tenable in practice.

It will now be recognized that the delays 44 and 76 provide a safety margin for a belated arrival of a sound termination mark or a premature arrival of a sound starter mark. In addition, these delays perform the important function of precluding an accidental removal of the sound starter marks during the processing of the film. In this connection it will be recalled that the first few frames of a film are frequently cut off and discarded during the film development operation. If the sound starter marks 54, 78 and 79 were at the beginning of the motion picture sequences, they would be cut off too, and a scene-correct sound playback would be impossible, inasmuch as the image frames accompanying the beginning of the sound accompaniment would then also be missing.

So far, no means have been shown for maintaining film and tape in synchronism during the display of a sound sequence. In many cases, such special intra-sequence synchronization means are not necessary if the sound start and termination methods according to the subject invention are employed. For instance, if the duration of the individual film sequences is kept fairly short, there is generally no serious chance for the projector and the tape recorder to run out of mutual synchronism. In family-type motion picture amateur work, the individual film sequences are customarily short. Where the filming of events of longer duration is contemplated, it is often possible to divide the filming into shorter sequences, each of which will have its own sound starter and sound termination marks.

Figure 6:
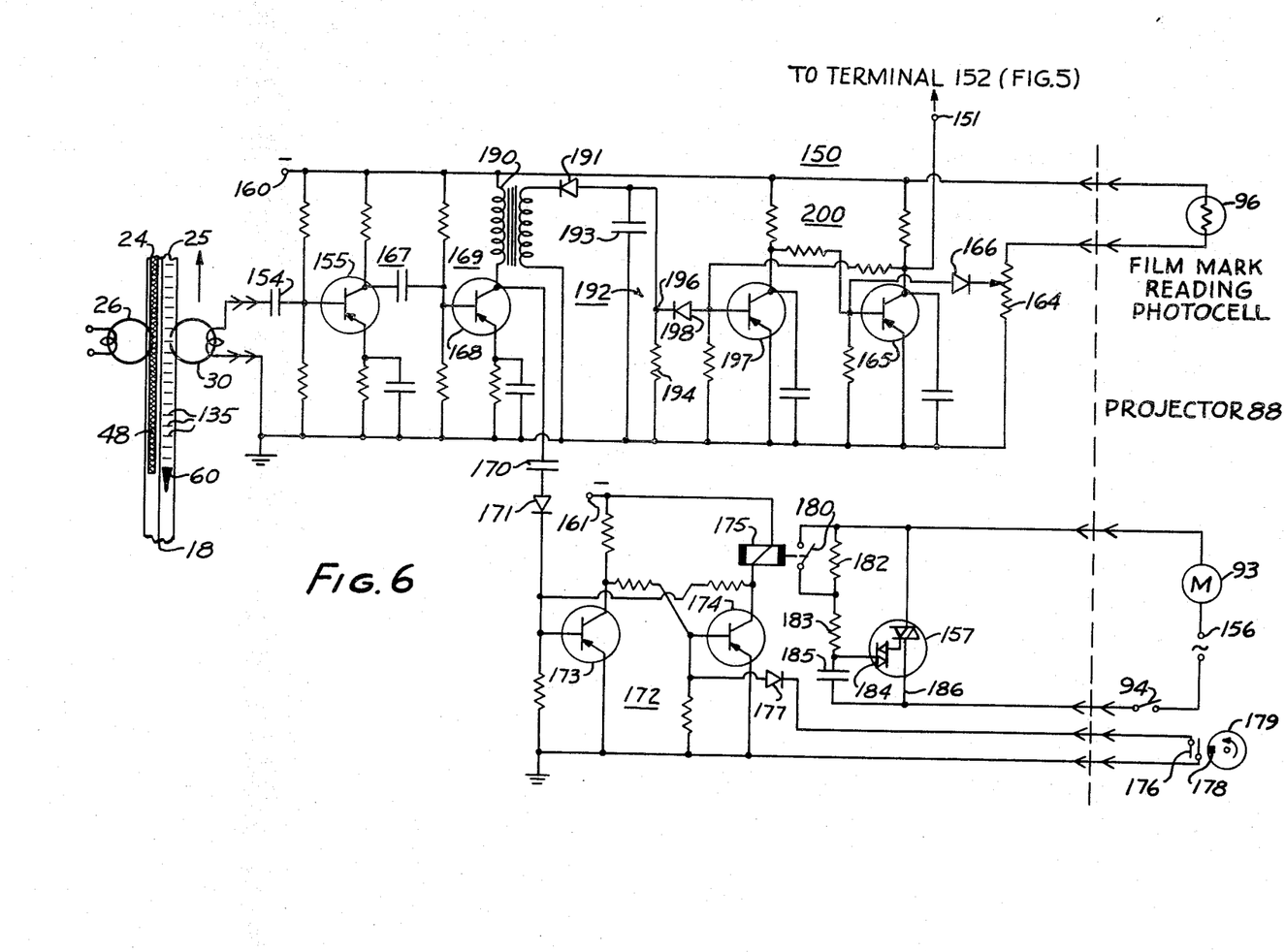
FIG. 6 is a circuit diagram of a further electronic control which may be incorporated in the system illustrated in FIG. 3.

However, where long sequences are to be filmed in an uninterrupted fashion, intra-sequence synchronization equipment may be used in combination with the means and controls according to the invention so far described. An advanced system of the latter type is shown in FIGS. 5 and 6. This system not only adds intra-sequence synchronization facilities to the previously described apparatus, but also adds various improvements to the system so far described.

The system illustrated in FIG. 5 is an improved electronic counter part of the system shown in FIG. 1. Accordingly, like parts as among FIGS. 1 and 5 are designated by like reference numerals.

The camera 11 in the system of FIG. 5 includes, in addition to the elements already described in connection with FIG. 1, a switch 110 which is periodically closed by a cam 112. This cam rotates in synchronism with the advance of the film 15 in the camera 11. To this effect, the cam 112 may be driven by the film advance mechanism so that it rotates at the frame advance rate or at any desired multiple or sub-multiple thereof. For present purposes, it is assumed that the cam 112 closes the switch 110 each time the film 15 is advanced to the next image frame. The operation of the system shown in FIG. 5 is initiated by closing the camera release switch 33 which energizes the camera motor 14 from the battery 35. This sets the film advance mechanism and the film 15 in motion. Accordingly, the switch 110 will be periodically closed at the prevailing image frame rate. This operation of the switch 110 results in the generation of a periodic waveform 114 at the circuit point 115. This waveform is established with the aid of a resistor 116 which is periodically connected across a battery 117 by operation of the switch 110. The waveform 114 is applied to an integrating circuit 118 which is composed of a capacitor 119 and a resistor 121. The integrating action of the circuit 118 builds up a charge across the capacitor 119 for the firing of a unijunction transistor 120. The elements of the integrating circuit 111 are dimensioned so that the firing of the transistor 120 takes place after the expiration of the delay 44 or 76 shown in FIG. 2 relative to the start of the filming of a motion picture sequence. As indicated above, this delay may be of the order of one second.

Firing of the unijunction transistor 120 provides across a resistor 122 a negative-going voltage which is amplified in a transistor 123 so as to drive a power transistor 124 to saturation.

Switching of the transistor 124 to saturation completes an energizing circuit for the tape recorder motor 22 from the battery 117. Accordingly, the tape recorder motor starts the tape 18 with a delay of about one second from the time the camera release switch 33 is closed. At the same time, the lamp 51 in the camera is caused to light up briefly for the provision of a sound sequence starter mark of the type shown at 54, 78 and 79 in FIG. 2 on the film 15.

To this end, a capacitor 126 is charged from the battery 117 through a resistor 127. A silicon controlled rectifier 128 is gated by a pulse provided by the switching of the transistor 124 to saturation. As illustrated, the silicon controlled rectifier 128 is connected so as to discharge the capacitor 126 through the lamp 51 in response to the gating pulse from the transistor 124.

The pulse train 114 appearing at the circuit junction 115 by action of the switch 110 is also applied through a pulse shaping network 130 to the previously mentioned tape recorder control head 30. The pulse shaping network 130 includes a diode 131, a resistor 132, and a capacitor 133 dimensioned so that the voltage train 114 is recorded on the control track 25 of the magnetic tape 18 in the form of a train of unidirectional pulses of short duration. An illustrative number of these pulses is shown at 135 in the control track portion 25 of the tape 18 depicted in FIG. 2. This pulse train 135 serves as an intra-sequence synchronization facility, as the pulses are synchronous with the advance of the film 15 in the camera 11. It will be understood in this connection that sound accompanying a motion picture sequence being filmed is recorded on the sound track portion 24 of the tape 18 by the previously mentioned recording head 26 while the pulse train 135 is simultaneously provided in the control track portion 25.

When the camera release switch 33 is open, the motor 14 stops and no more pulses are produced by the switch 110. Accordingly, the capacitor 119 in the integrating circuit 118 discharges itself through the unijunction transistor 120, and the transistors 120, 123 and 124 are switched off so that the tape recorder motor 22 is disconnected from the battery 117, and the tape 18 comes to a stop. Depending on the equipment used, the speed of this stopping operation is sufficient in most cases. However, where the stopping of the tape is too gradual, special braking means may be provided.

Accordingly, to provide for an accelerated stopping of the tape 18, the motor 22 may be shunted by a silicon controlled rectifier 137 which is triggered through a diode 138 and capacitor 139 by the positive-going surge which occurs between the transistor 120 and the resistor 122 when the transistor 120 is switched off. The control circuit shown in FIG. 5 thus provides a dynamic tape motor braking function in addition to its other operations.

The control circuit of FIG. 5 further includes a phase shift oscillator 141 which is composed of a transistor 142, as well as resistive and capacitive circuit components interconnected in a conventional manner. The phase shift oscillator 141 has the purpose of providing a termination mark of the type shown at 60, 85 and 86 in FIG. 2 at the end of each sound recording sequence. To this end, a capacitor 143 is charged by the battery 117 through a resistor 144. A diode 145 connected between the output of the transistor 124 and the base of the transistor 142 prevents the phase shift oscillator 141 from drawing current from the capacitor 143 and from starting to oscillate until the transistor 124 disconnects the motor 22 from the battery 117. In this instance the voltage across the diode 145 is reversed and the damping action at the base of the transistor 142 is thus removed, whereupon the phase shift oscillator 141 will oscillate at a gradually decaying amplitude until the charge of the capacitor 143 has been dissipated. The resistor 144 has a high resistance sufficient to prevent a sustained oscillation of the phase shift oscillator 114. The signal provided by the oscillator 141 thus has the form of a short burst.

The oscillator 141 may, for instance, be dimensioned to provide an output signal oscillating at a frequency of 2,500 cycles per second at full input voltage. This frequency diminishes as the charge on the capacitor 143 decreases. This frequency decrease is deliberate in the present circuit since it will compensate for the fact that the tape speed is decreasing at the same time as a result of the braking of the tape drive motor 22. The termination signal recorded in the control track 25 is, accordingly, of fairly constant frequency. At the same time, it is of gradually diminishing amplitude so that it can be easily distinguished upon playback from the intra-sequence synchronization pulses 135.

It will now be recognized that the apparatus of FIG. 5 provides an audio-visual recording system of considerable sophistication. A switch 149 may be provided at the battery 117 to permit the selective filming of sound-accompanied and of silent motion picture sequences. Prior to the filming of a silent sequence, the switch 149 is opened.

FIG. 6 schematically illustrates a system for a controlled playback of the motion picture sequences and sound accompaniments provided by the system of FIG. 5. Broadly speaking, FIG. 6 presents an improved electronic counterpart of the basic system shown in FIG. 3, so that like components are designated by like reference numerals as among the FIGS. 3 and 6.

The control 150 illustrated in FIG. 6 can advantageously be employed with the control illustrated in FIG. 5. To this effect, a terminal 151 of the control 150 is connected to a terminal 152 of the control shown in FIG. 5. It will be noted that the terminal 152 is in turn connected to the emitter of the unijunction transistor 120 of the control shown in FIG. 5, It will also be understood that the camera and the control signal recording head 30 are disconnected from the latter control when the system of FIG. 6 is in operation. In this case, the control signal head 30 of the tape recorder 12 acts as a control signal pickup head and is connected through a capacitor 154 to the base of a transistor 155 of the control 150, as shown in FIG. 6.

To provide for a supply of power to the control circuit 150, the terminals 160 and 161 shown in FIG. 6 are connected to the terminal 162 shown in FIG. 5 so that the battery 117 will act as a source of power for the control system shown in FIG. 6.

The projector 88 in FIG. 6 is started by the closing of a switch 94 which connects the motor 93 to a power line 156 through a thyristor 157. The photocell 96 shown in FIG. 6 has the purpose of sensing sound playback starter marks of the type shown in FIG. 2 at 54, 78 and 79 on the film 15 which, after photochemical processing, is now run through the projector 88.

The photocell 96 shown in FIG. 6 is of a type which lowers its resistance in response to light. As before, the photocell 96 is illuminated by a source of light when a sound playback starter mark appears in front of the photocell. The photocell 96 is connected in series with a potentiometer 164 between the terminal 160 and ground. Considering the above mentioned connections between the control 150 of FIG. 6 with the control of FIG. 5 this means that the series connected photocell 96 and potentiometer 164 are connected across the battery 117 shown in FIG. 5.

When the photocell 96 lowers in its resistance in response to a sound playback starter mark on the film 15, a transistor 165 is triggered through a diode 166 so as to connect the terminal 151 and thus the emitter of the unijunction transistor 120 in FIG. 5 to ground. This fires the transistor 120, so that the tape recorder motor 22 is connected across the battery 117 by action of the transistors 123 and 124. The tape 18 is thereby started for a sound playback operation through the sound signal pickup head 26. At the same time, the control head 30 will start to pick up the previously mentioned intra-sequence synchronization signals 135 from the control track portion 25 of the tape 18.

The synchronization signals picked up by the control head 30 are applied through the capacitor 154 to the transistor 155 of a first amplification circuit 167, and from there to the transistor 168 of a second amplification circuit 169. The positive-going portions of the amplified synchronization pulses are applied through a capacitor 170 and a diode 171 to a flip-flop circuit 172. This flip-flop circuit includes two transistors 173 and 174, and is designed in a conventional manner so that each pulse passing the diode 171 opens the transistor 173 which, in turn, closes the transistor 174 so as to energize a relay 175. The relay 175 remains energized as long as the transistor 174 is closed.

The transistor 174 is opened and the relay 175 is de-energized in response to the closing of a switch 176 which is connected to the base of the transistor 174 through a diode 177. The switch 176 may be a magnetic reed switch which is periodically actuated by a magnet 178.

The magnet 178 is located on the periphery of a disc 179 so that the switch 176 is closed once during each revolution of the latter disc. The disc 179 may be rotated by a shaft of the projector 88 which revolves nominally at the same rate as the shaft which drives the cam 112 of the camera 11 shown in FIG. 5.

The relay 175 is of a fast acting type and may, for instance, be a magnetic reed relay. It will now be understood that the relay 175 closes its contact 180 in response to each synchronization pulse 135 derived from the tape 18, and opens its contact 180 in response to each pulse produced by a closing of the switch 176. The angular position of the magnet 178 on the disc 179 is such that the switch contact 180 is closed during one-half of each image frame and is opened during the remaining half of the image frame if the advance of the film 15 is in synchronism with the movement of the tape 18.

The relay contact 180 is connected across a resistor 182 of a phase shift circuit which further includes a resistor 183 connected to the control electrode 184 of the bi-directional thyristor 157, and a capacitor 185 connected between that control electrode and the power terminal 186 of the thyristor 157.

The circuit elements 182, 183 and 185 are dimensioned in a conventional manner such that the projecter motor 93 runs at nominal speed if the contact 180 is closed during one-half of each frame cycle, and is open during the remaining half of the frame cycle.

In a preferred embodiment, the circuit elements 182, 183, and 185 are further dimensioned so that the projector motor 93 runs at 1.05 times nominal speed when the contact 180 is closed during the entire duration of a frame cycle, and so that the projector motor 93 runs at 0.93 times nominal speed when the relay contact 180 remains open for a full frame cycle.

Accordingly, the projector motor 93 will be energized back into synchronism if the pulses provided by the switch 176 should lag behind or advance with respect to the ideal 180° relationship of these pulses to the incidence of the synchronization pulses 135 at the control pickup head 30.

The stopping of the tape recorder motor 22 at the end of the playback of a sound sequence is effected in response to one of the previously mentioned termination marks 60, 85 and 86 in the control track portion 25 of the tape 18. In the circuitry shown herein, this stopping operation is conveniently initiated by a discharge of the capacitor 119 shown in FIG. 5, which results in a switching of the unijunction transistor 120 to the off state. Great care must, of course, be exercised in this connection to prevent a switching of the transistor 120 in the circuit of FIG. 5 by the pulses 135 prior to the termination of the playback of a sound sequence.

To this end a circuit could be provided which is responsive to the synchronization pulses 135 and which provides a signal that switches the transistor 120 to its off state only when no more synchronization pulses 135 are sensed by the control playback head 30 at the end of a sound sequence. In other words, the end of each sound sequence could be signified by a cessation of synchronization pulses 135. In this case, special termination marks of the type shown in FIG. 2 at 60, 85 and 86 could be dispensed with.

If termination marks are employed, these marks are sensed and the transistor 120 is switched to its off state in response to such marks. In the circuit shown in FIG. 6, the synchronization pulses 135 and the termination marks 60, 85 and 86 are sensed by the same control signal playback head 30. This requires that the synchronization pulses be distinguished from the termination marks so that a stopping of the sound playback by the pulses 135 is avoided. To this end, the output of the second amplifier stage 169 is applied through a transformer 190 and a diode 191 to a integrating circuit 192 composed of a capacitor 193 and a resistor 194.

The time constant of the integrating circuit 192 is such that the short and mutually spaced synchronization pulses 135 are not able to provide at the output 196 of the integrating circuit a signal sufficient to switch a transistor 197. The longer termination marks 60, 85 and 86, on the other hand, are able to provide such a switching signal.

In other words, sensing of a termination mark by the control signal playback head 30 causes the circuit 192 to trigger the transistor 197 to its "on" state through a diode 198. Since the transistor 197 and the previously mentioned transistor 165 are combined in a flip-flop circuit 200, triggering of the transistor 197 to its "on" state will trigger the transistor 165 to its "off" state, so that the capacitor 119 in the circuit of FIG. 5 is discharged and the unijunction transistor 120 is switched off.

As mentioned in connection with FIG. 5, this disconnects the tape recorder motor 22 from the battery 117 and applies dynamic braking to this motor by action of the silicon controlled rectifier 137. Accordingly, the playback of the particular sound sequence is terminated, and the tape recorder remains at rest until a new starter mark, such as the mark 78 shown in FIG. 2, is sensed by the photocell 96.

Until such time, one or more silent motion picture sequences can be displayed by the projector from the film 15. The transition from sound accompanied to silent display proceeds in an automatic fashion without any operation of manually actuable switches. Also, no sound tape is spent during silent motion picture sequences, as was the case in some prior art proposals.

Sensing of a sound playback starter mark by the photocell 96 triggers the transistor 165 to its "on" state as described above. Since the starter marks as shown in FIG. 2 occur in spaced relation to the beginning of the particular motion picture sequence, the tape recorder will automatically be started with the above mentioned required delay, indicated at 44 and 76 in FIG. 2.

Moreover, since the transistor 165 is incorporated in the flip-flop circuit 200 together with the transistor 197, the transistor 165, after having been triggered to its "on" state, will be maintained in such state, until the transistor 197 is triggered to its "on" state in response to a termination mark from the tape 18. Accordingly, the tape recorder will be kept running for sound playback during the period of time between each sound starter mark and sound termination mark.

It will now be recognized that the circuit shown in FIG. 6, when combined with the circuit of FIG. 5 in the manner described above, provides a highly sophisticated control for audio-visual display operations.

An alternative device for providing the above mentioned time delay between the start of a motion picture sequence and the start of a sound recording or playback operation is shown in FIG. 7. The mechanical actuation device 202 illustrated in FIG. 7 is advantageously incorporated into the above mentioned motion picture camera 11. If desired, at least part of this mechanism may be included in a handle (not shown) annexed to the camera 11.

The mechanism 202 includes a button 203 which is depressed when the camera 11 is to be actuated. The button 203 thus serves as a camera release. According to FIG. 7, this button projects from a wall portion 204 and is biased in the direction of such wall portion by a spring 205 which abuts another wall portion 207. The button 203 is mounted by a rod 208 which carries a disc 209 and a cup-shaped member 210. A spring 212 has an end portion located in the cup 210 and includes an opposite end portion situated in a similar cup-shaped member 213.

A piston rod 215 is attached to the cup 213 and to a piston 216. The piston 216 has an orifice 217 which is closed on one side by a flapper valve 218. The piston 216 rides in a cylinder 220 which has an orifice 221. A spring 222 located in the cylinder 220 biases the piston 216 in the direction of the camera release 203.

As is easily seen from FIG. 7, a pair of contacts 224 is closed by displacement of the disc 209 when the camera release button 203 is depressed, so as to connect the camera motor 14 to the battery 35. At the same time, the spring 212 is compressed and operates to push the piston 216 into the cylinder 220. Instantaneous movement of this piston is, however, restrained by the air in the cylinder 220. This air slowly escapes through the orifice 221 so that a further pair of contacts 226 is only closed by displacement of the cup 213 after the expiration of a delay from the moment of depression of the button 203.

It will be seen from FIG. 7 that the piston 216 and cylinder 220 operate as a dashpot arrangement by which the length of the latter delay may be determined by the size of the orifice 221 which may be of adjustable cross section for this purpose.

It will now be appreciated that the relay 40, which is shown also in FIG. 7, is only actuated after a predetermined delay from the energization of the camera motor 14. As in FIG. 1, this relay serves to close its contact 47 for the temporary energization of the lamp 51 which is located in the camera 11 to put a starter mark of the type shown at 54, 78 and 79 in FIG. 2 on the film 15. Also this relay serves to close its contact 46 for the energization of the tape recorder motor 22 and the charging of the capacitor 57 shown in FIG. 1 as a source of power for the oscillator 61.

Upon a release of the button 203, the spring 205 causes the disc 209 to return to its normal position so that the contacts 224 are opened to disconnect the camera motor 14 from the battery 35. At the same time, the spring 212 is relieved of its compression whereupon the cup 213 returns to its normal position, thereby opening the contacts 226 for the deenergization of the relay 40. The cup 213 will return to its normal position without a substantial delay, since the flapper valve 218 permits air to flow readily into the cylinder 220 when the piston 216 is moved by the spring 222 after a release of the button 203.

The relay 40 is thus deenergized substantially simultaneously with the camera motor 14. The tape recorder 12 will, therefore, stop at the same time as the motion picture camera 11.

It will be noted from FIG. 7 that the relay 40 is not absolutely necessary when the mechanism 202 is employed. For instance, the pair of contacts 226 could be replaced by a first contact set corresponding to the relay contact 47 and by a second contact set corresponding to the relay contact 46. Both of these contact sets would be positioned so as to be actuated by the cup-shaped member 213.

From an overall consideration of the systems herein disclosed, it will be recognized that the subject invention provides apparatus which are particularly well suited to the needs of the motion picture amateur. Each piece of equipment among the camera, the projector and the tape recorder can be used separately, inasmuch as the principles of the subject invention do not encumber the function of these apparatus for uses other than sound film recording and display.

The principles disclosed herein are not limited to the motion picture field. To the contrary, many of the disclosed concepts are applicable to areas such as those concerned with the provision of sound accompaniments for still pictures.

For example, the projector 88 could be a strip film projector which is stepped to project one image from a film strip at a time. Starter marks of the type shown at 54, 78 and 79 in FIG. 2 could then be provided on the film strip adjacent to each image to start the playback from the sound tape 18 of the sound accompaniment which is allocated to the particular image. Alternatively, the stepping of the film advance mechanism from one image display to the next could be sensed so as to provide a signal for the starting of the tape playback each time a new still picture is projected.

Other modifications within the spirit and scope of the subject invention will be apparent or will suggest themselves to those skilled in the art.

I claim:

1. In a method of reproducing sound sequences from a moving recording medium being started at the beginning of each sound sequence and stopped at the end of each sound sequence to provide individually allocated sound accompaniments for a motion picture film comprising the steps of:
   (a) automatically starting said recording medium at the beginning of each sound sequence in response to a predetermined operation of said motion picture film;
   (b) synchronizing the operation of said sound recording medium with said motion picture film during the simultaneous operation thereof; and
   (c) automatically stopping said recording medium at the end of each sound sequence in response to intelligence derived from said sound recording medium.

2. A method as claimed in claim 1, wherein said recording medium is automatically started at the beginning of each sound sequence after a predetermined delay subsequent to said predetermined operation of said image display means.

3. In a method of reproducting sound sequences from a moving sound recording medium being started at the beginning of each sound sequence and stopped at the end of each sound sequence to provide individually allocated sound accompaniments for a plurality of pictorial presentations displayed from film, the steps of:
   (a) recording said sound accompaniment sequences on a moving sound recording medium being started at the beginning of each sound sequence, and being stopped at the end of each sound sequence;
   (b) providing for the start of each sound sequence an optically detectable start indication on said film;
   (c) providing for the termination of each sound sequence a stop indication on said recording medium;
   (d) automatically starting said recording medium at the beginning of each sound sequence in response to a said optically detectable start indication on said film; and
   (e) automatically stopping said recording medium at the end of each sound sequence in response to a said stop indication on said recording medium.

4. A method as claimed in claim 3, wherein said recording medium is automatically started at the beginning of each sound sequence after a predetermined delay subsequent to the start of a pictorial presentation to which the particular sound sequence is allocated.

5. A method as claimed in claim 3, wherein:
   (a) said film is provided with a light-sensitive medium;
   (b) said indications are provided by selectively actuable means which expose said medium to light; and
   (c) said stop indication on said tape being a sound recorded signal.

6. A method as claimed in claim 3, including the steps of:
   (a) providing continual synchronization information on said sound recording medium; and
   (b) continually synchronizing each started sound sequence with the pictorial presentations to which it is allocated by controlling the display of such pictorial presentations in response to said synchronization information.

7. A method of recording sound sequences in synchronization with the exposure of motion picture film comprising the steps of:
   actuating a camera for the exposure of film therein;
   exposing a portion of the film within the camera to provide an optically detectable control signal for the actuation of a recording means upon playback;
   activating a recording means in response to the exposure of the film;
   generating synchronizing pulses indicative of the speed of the camera;
   recording said synchronizing pulses upon the recording means;
   interrupting the operation of said camera and recording means; and
   recording a control signal upon said recording means in response to the interruption of said camera so as to provide a stop signal upon said recording means.

8. The method of claim 7, which further comprises the steps of:
   energizing a bulb located within the camera so as to expose a portion of the film to provide a control signal for actuation of the recording means upon playback; and generating a control signal for recording upon said recording means to provide said stop signal upon playback.

References Cited

UNITED STATES PATENTS

| | | | |
|---|---|---|---|
| 3,181,421 | 5/1965 | Nimke et al. | 352—17 X |
| 2,693,127 | 11/1954 | Ortman | 352—17 |
| 2,932,235 | 4/1960 | Ochiai | 352—17 |
| 2,961,919 | 11/1960 | De Angelo | 352—17 |
| 3,447,864 | 6/1969 | Shadley | 352—17 |
| 3,475,088 | 10/1969 | Saiia | 352—92 X |

LOUIS R. PRINCE, Primary Examiner

J. W. ROSKOS, Assistant Examiner

U.S. Cl. X.R.

352—19, 25, 31, 92, 236